N. W. TRAVISS.
REVERSING MECHANISM FOR STRAW STACKERS.
APPLICATION FILED NOV. 20, 1919.
1,408,490.
Patented Mar. 7, 1922.
2 SHEETS—SHEET 1.
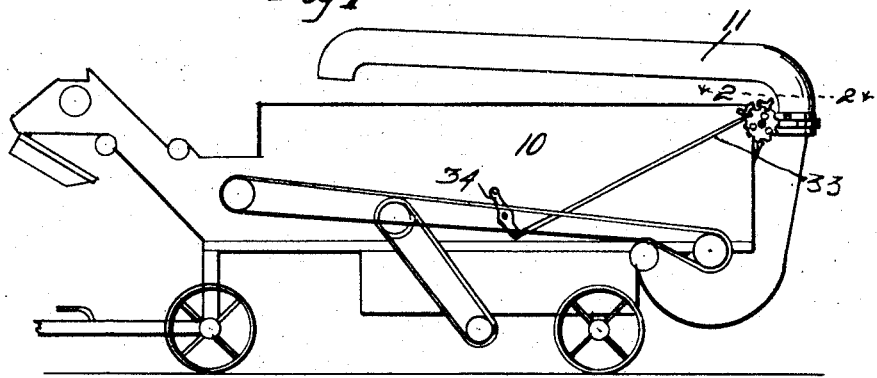
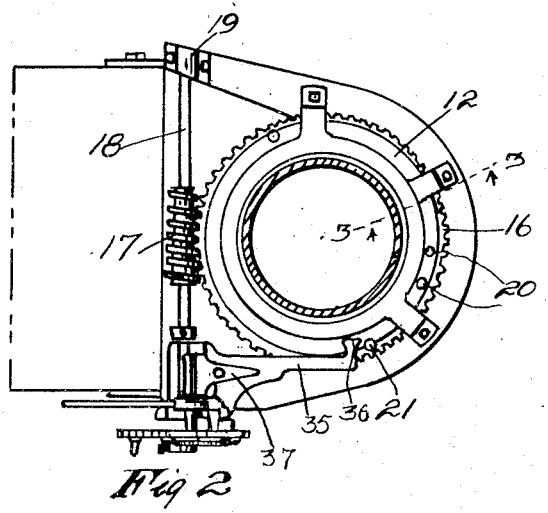
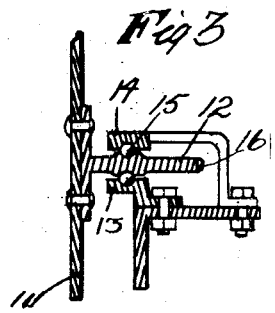
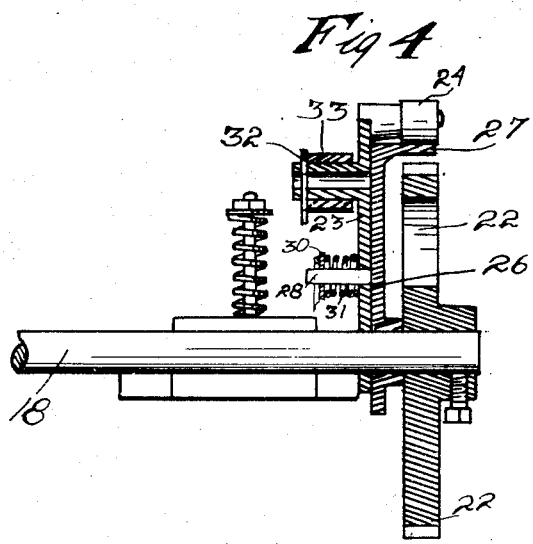
INVENTOR
Norman W. Traviss
By Osweig & Bair attys

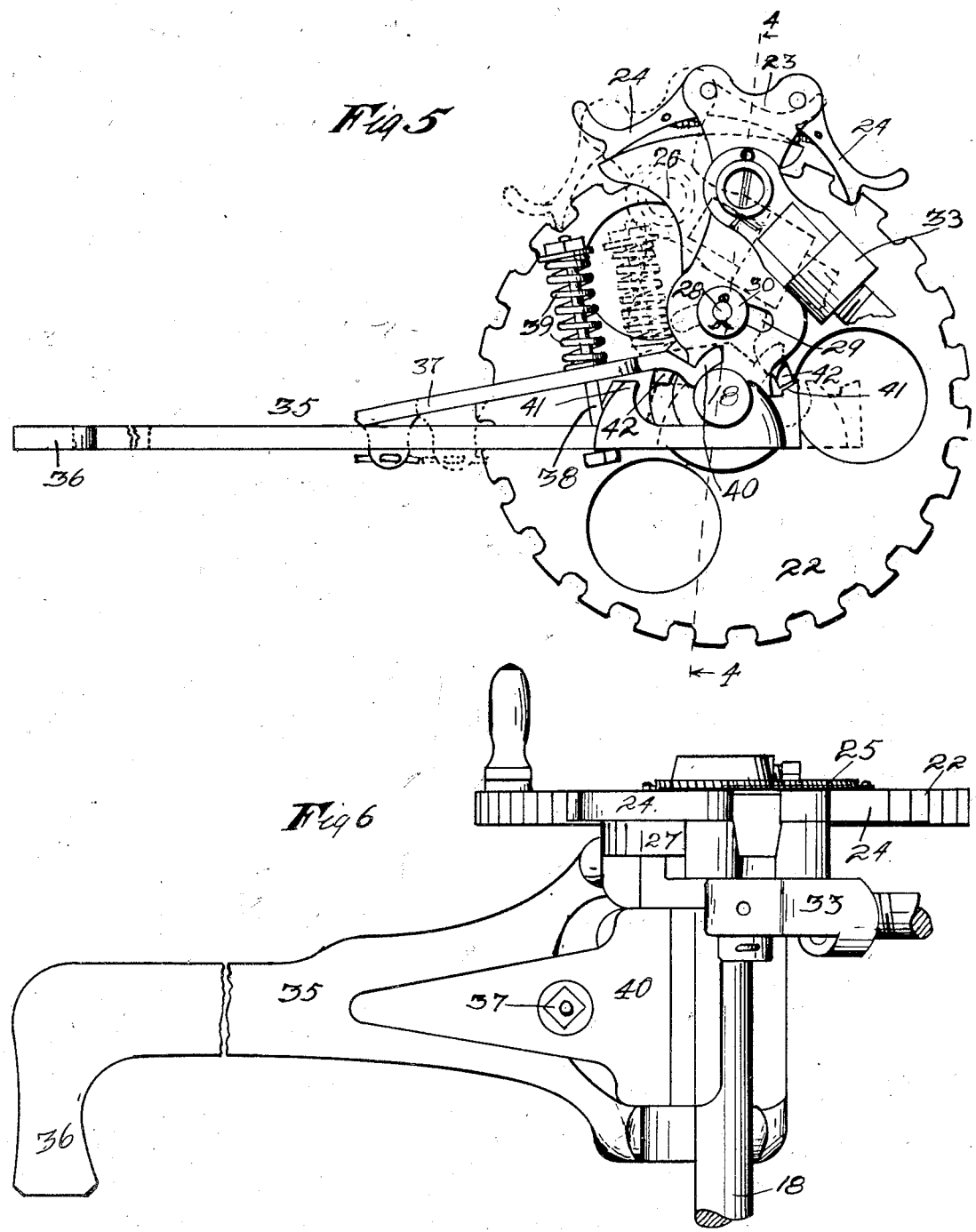

UNITED STATES PATENT OFFICE.

NORMAN W. TRAVISS, OF DES MOINES, IOWA, ASSIGNOR TO WOOD BROS. THRESHER CO., OF DES MOINES, IOWA, A CORPORATION.

REVERSING MECHANISM FOR STRAW STACKERS.

1,408,490.  Specification of Letters Patent.  Patented Mar. 7, 1922.

Application filed November 20, 1919. Serial No. 339,474.

*To all whom it may concern:*

Be it known that I, NORMAN W. TRAVISS, a citizen of the Dominion of Canada, and a resident of Des Moines, in the county of Polk and State of Iowa, have invented a certain new and useful Reversing Mechanism for Straw Stackers, of which the following is a specification.

The object of my invention is to provide a simple, durable and inexpensive reversing device especially adapted for use in connection with wind stackers, for the purpose of imparting an oscillating movement to the wind stacker, whereby there is imparted to the wind stacker a slow, even and positive drive and a quick reversal at the end of the stroke, and whereby a stroke may be given to the stacker through any desirable portion of an arc.

My invention consists in the construction, arrangement and combination of the various parts of the reversing mechanism, whereby the objects contemplated are attained, as hereinafter more fully set forth, pointed out in my claims, and illustrated in the accompanying drawings, in which:

Figure 1 shows a side elevation of a threshing machine having a wind stacker attached thereto and my improved reversing mechanism applied thereto.

Figure 2 shows an enlarged, detail, sectional view on the line 2—2 of Figure 1.

Figure 3 shows an enlarged sectional view on the line 3—3 of Figure 2, illustrating the means for rotatably supporting the wind stacker.

Figure 4 shows an enlarged sectional view on the line 4—4 of Figure 5.

Figure 5 shows an enlarged, detail, side view of the reversing mechanism. The dotted lines in this figure show the reversing mechanism adjusted to its opposite limit of movement and in position for imparting a reverse movement to the wind stacker; and Figure 6 shows a top or plan view of same.

Referring to the accompanying drawings, I have used the reference numeral 10 to indicate generally a threshing machine, and 11 a wind stacker, both of which are of the ordinary construction. The wind stacker is supported upon the threshing machine by means of a outwardly extending flange 12, having ball race-ways on its upper and under surfaces. This flange projects between the brackets 13 and 14 fixed to the threshing machine frame and also provided with ball race-ways, and in the ball race-ways are bearing balls 15. In this manner the stacker is rotatably and firmly supported in position.

On the periphery of the flange 12 are the gear teeth 16 which are in mesh with the worm drive 17, which worm drive is mounted on the shaft 18 mounted in fixed bearings 19 on the threshing machine frame.

In the rim 12 is a series of openings 20 in which the pins 21 are detachably mounted, for purposes hereinafter made clear.

In order to rotate the worm drive 17 slowly and continuously in one direction for a predetermined number of revolutions, and to then automatically reverse the movement for the same predetermined number of revolutions, I provide the following mechanism:

Fixed to the shaft 18 is a ratchet wheel 22, and rotatably mounted on the shaft 18 adjacent to the ratchet wheel 22, is a pawl carrier 23. At the upper end of this pawl carrier there are two pawls 24, extended in opposite directions. Connecting these pawls 24 is a contractile spring 25, by which the pawls are yieldingly held in the direction of the ratchet wheel 22, so that they may engage the ratchet teeth thereon.

Rotatably mounted on the shaft 18, between the pawl carrier 23 and the ratchet wheel 22, is a device for holding one or the other of the pawls in an inoperative position, which device comprises a body portion 26 rotatably mounted on the shaft 18, and a curved plate 27 extended over the ratchet wheel 22 and in position to come between one or the other of said pawls 24 and the ratchet wheel, to thereby hold said pawl in an inoperative position, as shown at the right in Figure 5.

The said pawl carrier 23 and the device for holding the pawls in an inoperative position are frictionally held together to operate in unison, as follows:

Connected to the body portion 26 is a pin 28 which extends through a slot 29 in the pawl carrier 23. On this pin is a washer 30, and between the washer and the pawl carrier is an extensile coil spring 31. By this means the two devices are frictionally held together, and yet may be moved through the radius of the slot 29 independent of each other.

On the outer end of the pawl carrier is an inwardly projecting bearing 32, to which a pitman 33 is pivotally connected. This pitman is connected to a crank shaft 34 on the machine, by which an oscillating motion is imparted to the pitman during the operation of the threshing machine.

By this arrangement it is obvious that when the parts are in the position shown by solid lines in Figure 5, and an oscillating motion is imparted to the pitman 33, the pawl 24 at the right will engage the ratchet wheel 22, and the other pawl 24 at the left will be held in its inoperative position. Each time that the pitman is operated, the ratchet wheel 22 will be rotated one tooth space, and this will rotate the shaft 18 on which the drive worm 17 is mounted.

When the parts are shifted to position shown in dotted lines in Figure 5, then the pawl to the left will be in engagement with the ratchet wheel, and the pawl to the right will be held in inoperative position, so that as the pitman is oscillated the driving worm 17 will be rotated in an opposite direction.

In order to provide for shifting the positions of the pawl carrier and the device for holding one or the other of the pawls inoperative, I have provided the following mechanism:

The reference numeral 35 indicates a reversing arm slidingly supported and having a head 36 in position to be engaged by the pins 21. On the end of the reversing arm opposite from the head 36 is a bearing for the shaft 18, which bearing is much wider than the shaft and will permit the reversing arm 35 to move relative to the shaft 18 in a direction at right angles thereto. Pivoted to the reversing arm 35 is a drive shaft latch 37, having a bolt 38 and spring 39 applied to it, whereby it is yieldingly held toward the reversing arm. The free end of the drive shaft latch is provided with a downwardly projecting lug 40, for the purpose of yieldingly engaging the shaft 18.

This latch device is so arranged that when it is moved from the position shown in Figure 5, toward the right, then the lug 40 will be elevated to permit it to pass to the other side of the shaft 18, where it will again be yieldingly held in position, as shown by the dotted lines.

Carried by the reversing arm 35 are two shoulders 41, and carried by the part 26 are two shoulders 42. These shoulders are so arranged relative to each other that when the parts are in the position shown by solid lines in Figure 5, the shoulders 42 and 41 at the right will engage when the pawl carrier is at the limit of its movement toward the right. But when it is at its limit of movement toward the left, the opposite pair of shoulders 41 and 42 will not engage. However, when the reversing arm 35 has been moved from its position shown by solid lines in Figure 5 toward the right, as shown by dotted lines, then the opposite shoulders 41 and 42 will engage and the others will not.

By this arrangement of parts the device for holding one or the other of the pawls in inoperative position is automatically shifted with relation to the pawl carrier. For instance, referring to Figure 5, it will be readily seen that when the pitman 33 is moved toward the right the shoulder 42 will strike the shoulder 41 and cause the device for holding the pawl in an inoperative position to assume the position shown in Figure 5, whereas if the reversing arm 35 is shifted to its limit of movement toward the right, then the opposite one of the shoulders 42 will strike the opposite one of the lugs 41 and cause the device for holding the pawl inoperative to be moved toward the right with relation to the pawl carrier, so that the two pawls will then assume their position, as shown in dotted lines in said figure, and the movement of the stacker will be reversed.

In practice it will be seen that the construction of the mechanism for imparting the alternating oscillating motion to the stacker is of extremely simple and inexpensive construction. All of the motion for swinging the stacker is imparted through the pitman 33, and as this pitman is oscillated one of the pawls 24 will engage the ratchet wheel 22 and move it, one tooth at a time, thus rotating the shaft 18 and causing the drive worm 17 to rotate the stacker through a part of a circle. This operation continues until one or the other of the pins 21 strikes the reversing bar 35, whereupon this reversing bar is shifted in its position relative to the shaft 18, and shortly after this is shifted, one of the lugs 42 engages the coacting lug 41 and causes the position of the device for holding one of the pawls inoperative, to be reversed relative to the pawl carrier, and this will throw the pawl that was previously in use, to an inoperative position, and the pawl that was previously in an inoperative position, to a position for use, whereupon the direction of rotation of the ratchet wheel 22 will be reversed.

Obviously the stacker may be made to oscillate through any part of the arc of a circle, by simply moving the pins 21 into any one of the openings 20.

I claim as my invention:

1. In a device of the class described, the combination of a drive shaft; a member to be oscillated; means for operatively connecting the drive shaft to the member to be oscillated; a ratchet wheel carried by the drive shaft; a pawl carrier loosely mounted on the drive shaft; two pawls thereon, extended in opposite directions; a device for holding one or the other of said pawls in inoperative position; means for frictionally holding said device to the pawl carrier; means for reciprocating the pawl carrier; a sliding reversing bar; means carried by the member to be oscillated, for moving the sliding reversing bar; and means carried by the sliding reversing bar and the device for holding one or the other of the pawls inoperative, whereby said device is automatically shifted with relation to the pawl carrier to hold one or the other of said pawls out of engagement with said ratchet wheel.

2. In a device of the class described, the combination of a rim to be oscillated, said rim having gear teeth thereon; a drive shaft; a worm on the drive shaft, in mesh with the teeth on said rim; a ratchet wheel fixed to the drive shaft; a pawl carrier loosely mounted on the drive shaft; a pitman connected to the pawl carrier; two pawls mounted on the pawl carrier and extended in opposite directions; a device for holding one or the other of said pawls in inoperative position, loosely mounted on the drive shaft, and having a curved shield between the pawls and the ratchet wheel, for the purpose of engaging one of said pawls at a time and preventing it from engaging the ratchet wheel; means for frictionally holding said pawl carrier and the said device together, said means being designed to permit one to move to a limited extent relative to the other; a reversing slide bar having a wide bearing therein for the drive shaft; and a drive shaft latch device yieldingly held toward said bearing to hold the slide bar with the shaft at one limit or the other within the slide bar, said device for holding the pawls inoperative and said slide bar being provided with coacting lugs, said lugs being so arranged that when the slide bar is shifted to one position, the lugs on one side will engage and on the other side not engage, and when the position of the slide bar is shifted, the first mentioned lugs will not engage and the last ones will engage, whereby the position of the device for holding the pawls inoperative will be shifted relative to the pawl carrier, for the purposes stated.

Des Moines, Iowa, October 25, 1919.

NORMAN W. TRAVISS.